Jan. 20, 1970  F. W. AINSWORTH  3,490,281
LOCAL VERTICAL CONTROL APPARATUS
Filed April 28, 1967  2 Sheets-Sheet 1

INVENTORS.
FRANK W. AINSWORTH

BY
ATTORNEY

INVENTORS.
FRANK W. AINSWORTH

ATTORNEY

Patented Jan. 20, 1970

3,490,281
LOCAL VERTICAL CONTROL APPARATUS
Frank W. Ainsworth, Golden Valley, Minn., assignor to Honeywell Inc., Minneapolis, Minn., a corporation of Delaware
Filed Apr. 28, 1967, Ser. No. 634,730
Int. Cl. G01c 21/00
U.S. Cl. 73—178                                         10 Claims

ABSTRACT OF THE DISCLOSURE

The objective is to provide a local vertical inertial navigation platform having the combined benefits of both local vertical orientation and specific electrostatically suspended gyroscope utilization. The system makes conventional use of local vertical gimballing, involving three gimbal axes, two accelerometers and a navigation computer but which makes novel use of two strapdown type gyros having universally suspended rotors such as the electrostatic gyro.

The electrostatically suspended gyros provide long-term gyro stabilization of the local vertical platform. Since the electrostatically suspended gyros are the strapped-down type, an angle readout therefrom is compared with a computer desired angle, such as that angle due to rotation of the earth or movement of the craft relative to the earth between geographical points thereon, and gimbal drive motors are driven in accordance with a difference between the angle readout quantity and the computer desired angle to maintain the local vertical.

---

This invention relates to vertical reference defining apparatus of the type used in navigation guidance apparatus for an aircraft or other moving craft during movement thereof relative to the surface of the earth from one geographical location thereon to another.

Vertical reference devices or apparatus which are compensated for the rotation of the earth so that the apparatus is continually held to the vertical are shown for example in the U.S. Patent to C. S. Draper, et al. 2,752,792 issued July 3, 1956. Thus from the patent to Draper, et al., the torque generator from a single degree of freedom gyroscope is energized to thereby cause the inertial space of the gyro to now conform to the earth-vertical space. Consequently, as the earth rotates the platform on which the gyro means is mounted is held parallel to the surface of the earth.

In a prior arrangement, a previous platform using electrostatically suspended gyros had been merely inertial space stabilized, and not earth space stabilized, wherein the electrostatic gyros had end axis pickoffs for providing signals. Space stable operation was previously dictated because the electrostatic gyros cannot be torqued accurately as in the case of the single degree of fredom gyros as in the above patent to Draper, et al.

In many applications, in addition to providing a local vertical for providing a proper attitude reference for an automatic pilot, a local attitude device providing good attitude reference for mounting a star tracker or other device is desired. In other words, a local vertical platform, that is one that maintains the platform parallel with the surface of the earth despite rotation of the earth or movement of the platform from one geographical position on the earth to another is the optimum orientation for many applications in order to mount star tracker, photographic apparatus and other devices.

Thus while in the prior art, a space stabilized platform as opposed to a local vertical platform has been heretofore provided with electrostatically suspended gyroscopes yet such space stabilized platform has not been heretofore adapted to provide a local vertical. An electrostatically suspended gyroscope consists of a spherically shaped rotor member universally supported on a support which support is fixed relative to the platform and wherein the rotor is adapted to spin relative to said support about a spin axis for sensing and measuring relative rotation between the support member and the rotor member about any axis at an angle to the spin axis.

An object, therefore of this invention is to provide a local vertical inertial platform or vertical reference having a platform supporting two universally suspended rotors such as electrostatically suspended gyros.

A further object of this invention is to provide a novel vertical reference apparatus wherein a platform that supports linearly responsive accelerometers and free gyroscopes is slaved to the local vertical.

A further object of this invention is to provide a novel vertical reference apparatus comprising a pair of all attitude free gyroscopes and a pair of linear motion accelerometers said gyroscopes and accelerometers jointly controlling the slaving of the platform to the local vertical.

The above and further objects of the invention will be apparent to those skilled in the art upon consideration of the accompanying specification, claims, and drawings in which:

Figure 1:
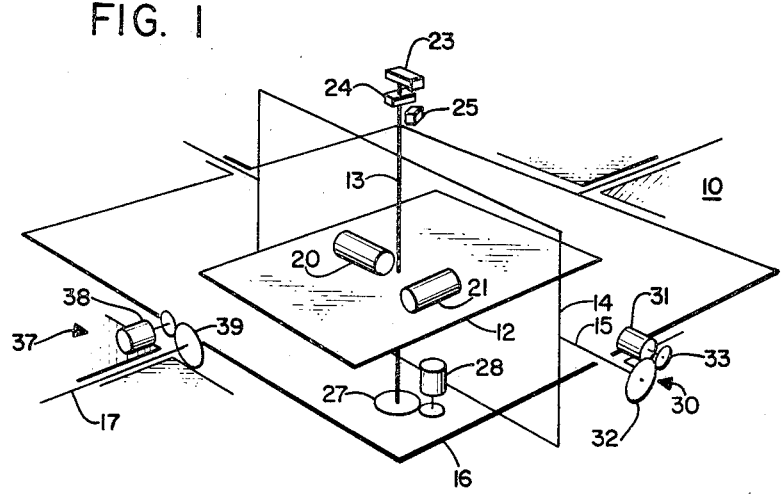
FIGURE 1 is a schematic diagram of a vertical reference which may be used in the system of FIGURES 2 and 3, but is not restricted thereto.

Referring now to FIGURE 1, the local vertical reference can comprise an inertial measuring unit 10 having a platform 12 mounted for rotation in a gimbal arrangement about three respectively perpendicular axes. For this purpose, the platform 12 is supported on an axis 13 in an inner gimbal ring 14 that in turn is supported about an axis 15 in an outer gimbal ring 16. Gimbal ring 16 in turn is supported on an axis 17 in the frame of the moving vehicle, which may be an aircraft. Platform 12 supports attitude sensing means such as a pair of gyroscopes 20, 21 having their rotors mounted with their spin axis relatively perpendicular. The gyroscopes are what as known in the art as free gyroscopes. The gyroscope means 20, 21 may be of the all attitude free gyroscope type with each gyroscope having a support member and a spherically shaped rotor member universally supported on said support member and adapted to spin relative to said support about a spin axis, for sensing and measuring relative rotation between the support member and the rotor member about any axis at an angle to the spin axis. The gyroscopes 20, 21 may be of the type disclosed in the United States Patent to W. H. Kunz No. 2,959,060 issued Nov. 8, 1960. One gyroscope may be arranged to sense roll attitude changes of the craft and heading changes of the craft whereas the other gyroscope is arranged to sense pitch attitude change of the craft and azimuth or heading changes of the craft. Also associated with platform 12 and supported thereto are three linear movement responsive accelerometers 23, 24, 25 arranged in three respectively perpendicular directions, one accelerometer sensing east-west accelerations of the platform a second sensing north-south accelerations of the platform, and a third sensing vertical accelerations corresponding with the accelerations along the z axis. Also associated with the platform 12 is an azimuth or heading gimbal servo motor drive arrangement 27 including motor 28 and conventional rate gyros (not shown) for sensing angular rate of the platform and inertial space.

Between the outer gimbal ring 16 and the inner gimbal ring 14 and associated with axis 15 is a pitch gimbal servo motor arrangement 30 comprising motor 31 fixed to outer gimbal 16 having gearing 33 thereon interconnecting with a driven gear 32 on axis 15.

Associated with axis 17 is a roll gimbal servo motor arrangement 37 comprising a motor 38 secured to the air frame and a driven gear 39 secured to outer gimbal ring 16.

Figure 2:
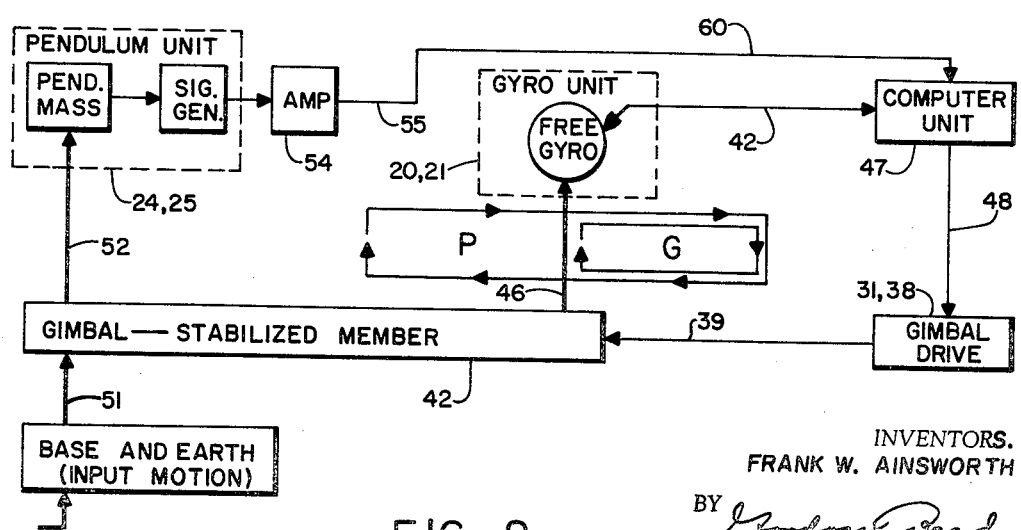
FIGURE 2 is a functional or block diagram of the components of FIGURE 1, showing their electrical and mechanical interrelation.

The operational relationship between the azimuth gimbal servo motor 28, and roll gimbal servo motor 38 with the accelerometers, 23, 24 and the gyros 20, 21 will be appreciated by reference to FIGURE 2. FIGURE 2 herein similar to FIGURE 3 of Draper, et al. 2,752,792 has two loops, one a pendulum loop, P, the other the gyro loop, G. However, instead of gyros having torque generators as in Draper, et al., the gyros 20, 21 are electrostatically suspended free gyros that are not torqued. This causes or requires a different form of control for orienting platform 12 from that in Draper, et al.

In the gyro loop G FIGURE 2 assuming a non-rotating earth and no displacement of platform 12 about the center of the earth, angular motion of the platform 12 is applied by connection 46 to gyros 20, 21. Changes in platform attitude that are sensed by gyros 20, 21 are supplied by transmission means 42 to computer 47. Computer 47 supplies by transmitting means 48, the error between the desired and sensed attitudes to positioning means such as pitch and roll gimbal servo motors 31, 38 for gimballed-stabilized member 12 to remove such motion null sensors 20, 21.

To also maintain the local vertical on a moving platform, the effect due to motion relative to the earth, or displacement of platform 12 about the center of the earth on platform 12 is compensated by the accelerometer loop corresponding to the pendulum loop P of Patent 2,752,-792. Thus motion of the craft and platform 12 about the center of the earth is supplied by transmission means 52 to pendulum or accelerometers 23, 24. The accelerometers 23, 24 which are not affected by gravitational acceleration, but respond to linear accelerations supply their acceleration outputs through amplifier 54 and transmission means 55 to computer 47 wherein a conventional double integration of the acceleration is effected, to compensate for such motion to provide long term stabilization to platform 12. The gyroscopes 20, 21 as stated above provide the short term stabilization for the platform. Thus if the aircraft tilts, displacement gyros 20, 21 supply a signal to return platform 12 to vertical. The acceleration input on transmission means 60 to computer 47 as modified therein supplies the compensation conventionally provided due either to rotation of the earth or for displacement of the craft about the center of the earth.

Figure 3:
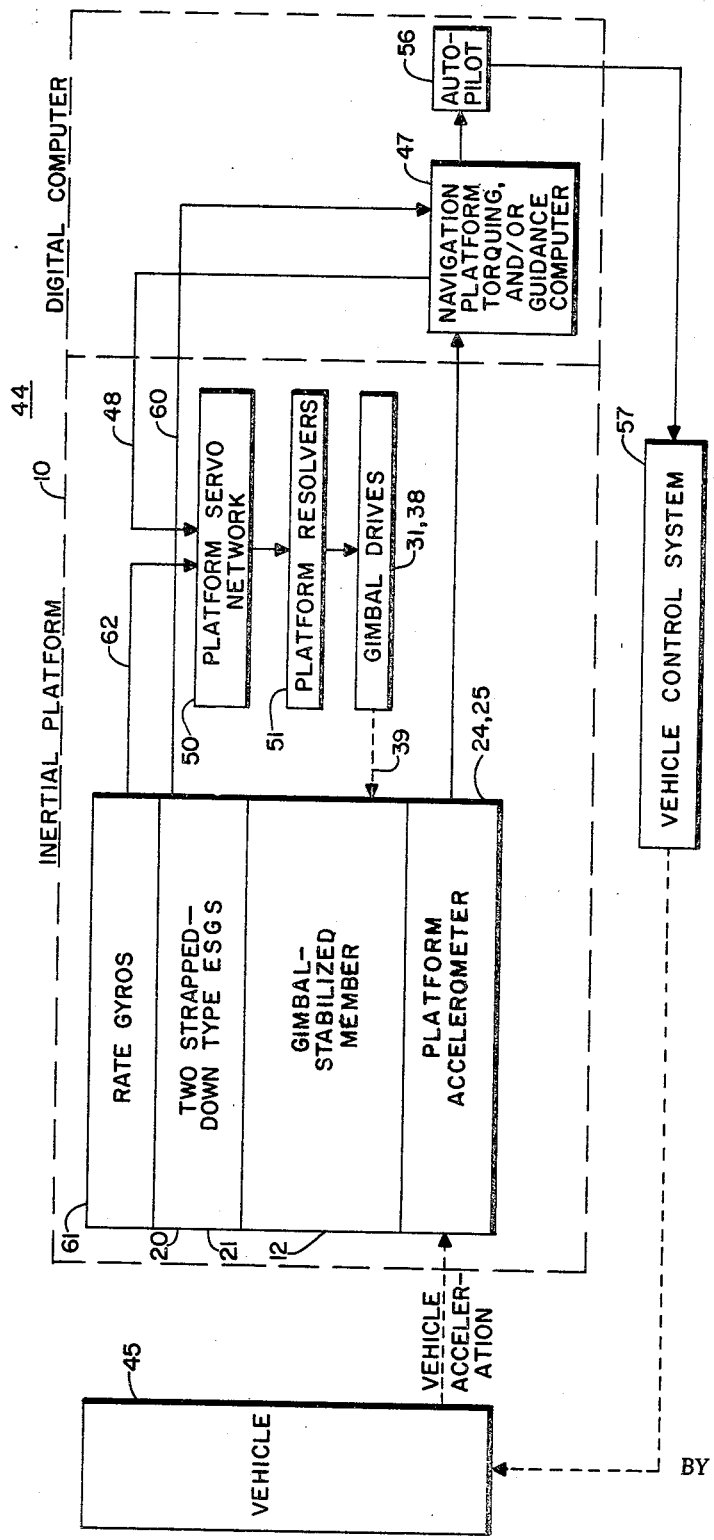
FIGURE 3 is a block diagram of an inertial guidance system for an aircraft.

In FIGURE 3 an over-all guidance system 44 for a moving vehicle is shown in schematic relation with the vehicle mounted control system. Such vehicle control system may be the rudder, ailerons, and elevator of a conventional aircraft or similar means for changing the attitude of a moving vehicle. In FIGURE 3, vehicle 45 has a position, velocity and acceleration. Accelerations of vehicle 45 are applied to the linear accelerometers 23, 24, 25 on inertial platform 10 which develop accelerations or acceleration signals that are applied to a conventional computer 47, that effect a conventional double integration of the acceleration signal of a guidance system.

The computer 47 supplies such double integrated acceleration signal over conductor 48 a control that compensates the local reference for earth rotation and also for changes in the geographical position of the moving vehicle from one geographical point on the earth to another. The control on transmission means 48 is supplied to a platform servo network 50, thence to conventional platform resolvers 51, to gimbal drives 40 as shown arranged in FIGURE 1. The output from the guidance computer 47 is also supplied to an autopilot 56 that includes operating means for the vehicle control system 57 such as control surfaces of the vehicle.

The output of the two strapped-down electrostatically suspended gyros 20, 21, with a universally suspended rotor, are supplied through transmission means 60 to the computer 47. Also the platform 12 may support conventional rate gyros 61 which develop rate signals in accordance with the movement of platform 12 relative to the vehicle with the outputs from such gyros 61 being supplied by transmission means 62 to platform servo network 50.

Computer 47 is capable of performing integrations and subtractions of the conventional type which converts the N-S and E-W direction of linear accelerations of the craft relative to the earth into corresponding changes in latitude and longitude which computed angles or latitude and longitude changes are applied to the platform servo network 50 and to the gimbal drive to change the position of the platform 12 so that it would be normally parallel with the surface of the earth. The computer also corrects platform position due to rotation of the earth.

The strapped-down electrostatically suspended gyros 20, 21 measure or sense the resulting actual change in attitude of platform 12 as the craft changes geographical position on the earth. The computer 47 supplies over transmission means 48 desired changes in platform attitude derived from the signals from the accelerometers, or due to rotation of the earth and these changes are compared with the change as measured or sensed by the strapdown electrostatically suspended gyros 20, 21 on transmission means 60. Under normal conditions the two outputs on 48 and 60 should correspond, however, in the event that they differ the difference between them is supplied to the gimbal drives 40 such as arrangements 30, 37 for the gimbal rings 12, 14 to re-orient them in accordance with the measured changes in angles derived from the electrostatically suspended gyros to reduce the difference to zero.

It should be noted that each of the gyros 20, 21 in effect functions as a two degree of freedom gyro in that each provides two attitude signals one being a signal common with the two gyros consequently one output of one gyro is redundant.

It will now be apparent that there has been provided a novel local vertical platform which utilizes electrostatically supported gyros each having a rotor mounted for universal movement with respect to the support wherein the long-term accuracy of such gyroscopes is used to measure changes in attitude of the platform relative to inertial space to normally maintain the platform in an inertial space stable position and wherein the output of the accelerometers on the vertical reference device are used to modify the position of the platform not only in accordance with the changes in geographical position of the platform with respect to the earth but also for changes due to rotation of the earth whereby to reposition the platform to the local vertical of the new geographical position. This repositioning of the platform to the local vertical is obtained without the requirement of torquing the platform mounted gyroscopes as in the prior art and the change in position of the platform is achieved by a comparison of a gyroscopically measured change in angles to a computed and required change in angles. Having thus shown and described a specific embodiment of the invention further modifications and improvements will occur to those skilled in the art.

What is claimed is:

1. In gyroscopic apparatus for defining a local vertical reference, in a moving craft, of the kind including a platform supported in a gimbal mount with freedom of angular movement about two mutually perpendicular normally horizontal axes, gyroscopic means connected to the platform including means for stabilizing the platform during angular movement of the craft relative to the platform, acceleration responsive means and computing means associated with the platform providing two output signals representing desired component space angles of the platform which are used to additionally control the means for stabilizing the platform, to cause the platform to rotate about its horizontal axes in such a gimbal mount, as to provide compensation for the effect of the earth's rotation and craft's displacement relative to the earth, said gyroscopic means comprising two free gyroscopes mounted in orthogonal relationship on said platform.

2. The apparatus of claim 1 wherein said gyroscopes are of the electrically suspended type.

3. The apparatus of claim 1 wherein the gyroscopes have a spinning member supported within a casing the said casing being so mounted on platform as to have no relative rotation therebetween.

4. The apparatus of claim 1 wherein the spinning member of the gyroscope is electrostatically suspended and has additional axes of freedom in addition to its spin axis.

5. The apparatus of claim 1 wherein the supporting means between the platform and the aircraft comprises three gimbals rotatable about respectively three perpendicular axes.

6. The apparatus of claim 1 wherein each gyroscope comprises a support member secured to the platform against relative rotation and a spherically rotor member universally supported on said support and adapted to spin relative to said support about a spin axis, for sensing and measuring relative rotation between the support member and the rotor member about any axis which is at an angle to the spin axis.

7. The apparatus of claim 1 wherein said gyroscopes have rotors that are fully universally supported.

8. In gyroscopic navigation apparatus, means for defining a local vertical reference in a moving craft, said means including a platform mounted with freedom of angular movement about a normally vertical axis and about two mutually perpendicular normally horizontal axes, gyroscopic means connected with the platform for stabilizing the platform against angular movements of the craft, linear accelerometers connected to the platform, accelerometer controlled computing means to provide two output signals representing components space angular velocity of the craft for controlling gimbal servos of said platform to cause the platform with the gyroscopic means thereon to rotate about its horizontal axes so as to provide compensation for the effect on the platform and gyroscopic means of the rotation of the earth about its axis and the craft's velocity around the earth, wherein said gyroscopic means comprises a pair of electrostatic gyros each sensing changes in platform attitude about a pair of respectively perpendicular axes, one sensing changes in azimuth and roll attitude of the platform, the other sensing change in azimuth and pitch attitude of the platform, and means supplying the signals from said two gyros to said computing means in opposition to said signals representing craft space angular velocity.

9. The apparatus of claim 8, including additional gyroscopes for detecting angular rates between the platform and inertial space and supplying signals for additionally controlling the gimbal servos.

10. In a navigation system having apparatus for defining a vertical reference in a moving craft including a platform mounted with freedom of angular movement about a vertical axis and about two mutually perpendicular normally horizontal axes, gyroscopic means comprising two spherically shaped rotor members each universally mounted on a support connected to the platform and adapted to spin relative to said support about a spin axis for stabilizing the platform against angular movements of the craft, in combination: two accelerometers mounted to the platform and perpendicular relatively to each other to sense accelerations of the craft in two normally horizontal directions perpendicular to each other, and means receiving two inputs, one controlled by the gyroscope means and the other by the accelerometers, for stabilizing the platform to provide compensation for the effect of the earth's rotation and the craft's velocity relative to the earth for maintaining the platform parallel to the earth's surface.

References Cited

UNITED STATES PATENTS

| | | | |
|---|---|---|---|
| 2,752,792 | 7/1956 | Draper et al. | 74—5.34 |
| 2,959,060 | 11/1960 | Kunz | 74—5.6 |
| 3,313,161 | 4/1967 | Nordsieck | 74—5.6 |
| 3,391,568 | 7/1968 | Dozier | 73—178 XR |

FOREIGN PATENTS 762,346  11/1956  Great Britain.

DONALD O. WOODIEL, Primary Examiner

U.S. Cl. X.R.

74—5.34